US011164434B2

(12) United States Patent
Yang

(10) Patent No.: US 11,164,434 B2
(45) Date of Patent: Nov. 2, 2021

(54) EAS DEVICE WITH ELASTIC BAND

(71) Applicant: Xiao Hui Yang, Saratoga, CA (US)

(72) Inventor: Xiao Hui Yang, Saratoga, CA (US)

( * ) Notice: Subject to any disclaimer, the term of this patent is extended or adjusted under 35 U.S.C. 154(b) by 0 days.

(21) Appl. No.: 17/183,134

(22) Filed: Feb. 23, 2021

(65) Prior Publication Data

US 2021/0264757 A1 Aug. 26, 2021

Related U.S. Application Data

(60) Provisional application No. 62/981,203, filed on Feb. 25, 2020.

(51) Int. Cl.
*G08B 3/10* (2006.01)
*G06Q 10/08* (2012.01)
*H04W 4/02* (2018.01)
*G08B 13/24* (2006.01)

(52) U.S. Cl.
CPC ........... *G08B 13/2434* (2013.01); *G08B 3/10* (2013.01); *G08B 13/248* (2013.01)

(58) Field of Classification Search
CPC .................................................. G08B 13/2434
See application file for complete search history.

(56) References Cited

U.S. PATENT DOCUMENTS 5,610,585 A 3/1997 Jobe
5,794,464 A 8/1998 Yeager et al.
6,092,401 A 7/2000 Sankey et al.
7,481,086 B2 1/2009 Fawcett et al.
7,918,112 B2 4/2011 Fawcett et al.
8,044,806 B2 10/2011 Sayegh
8,528,372 B2 9/2013 Nilsson
8,938,997 B2 1/2015 Piccoli et al.
9,165,441 B2 10/2015 Tinti
9,953,498 B2 * 4/2018 Van Landingham, Jr. .................. G08B 13/2434
2006/0170550 A1 * 8/2006 Marsilio ............ G08B 13/2434 340/568.2
2010/0139336 A1 6/2010 Necchi
2014/0152441 A1 * 6/2014 Tinti .................... G08B 13/149 340/568.2
2016/0049055 A1 * 2/2016 Berglund ........... G08B 13/2434 340/568.2

* cited by examiner

*Primary Examiner* — Joseph H Feild
*Assistant Examiner* — Pameshanand Mahase
(74) *Attorney, Agent, or Firm* — Brian W. Foxworthy; Robert R. Waters; Waters Law Group, PLLC

(57) ABSTRACT

An electronic article surveillance (EAS) device for monitoring items comprises an electronics housing and an elastic band. The band is attached to the housing and is used to install the EAS device onto an item. A tension monitoring apparatus monitors the band and generates a signal based on the band's state of tension. Electronics within the housing receive this signal and use it to determine the status of the EAS device, i.e. installed, armed, tampered with, etc. Loss of tension may indicate a cut band or removed EAS device. Other sensors may also generate inputs for the electronics to evaluate. These include an installation sensor to monitor contact between the housing and an item and an arming switch to arm the EAS device before installation. The EAS device may have wireless communication capabilities, and external devices may arm and disarm the device with wireless communication.

29 Claims, 9 Drawing Sheets

EAS DEVICE WITH ELASTIC BAND

CROSS REFERENCE TO RELATED APPLICATIONS

This application is a utility application which claims priority to U.S. Provisional Application 62/981,203, filed on Feb. 25, 2020. The entire disclosures contained in U.S. Provisional Application 62/981,203 including the attachments thereto, are incorporated herein by reference.

FIELD OF INVENTION

The present application is generally related to an electronic article surveillance (EAS) device. More specifically, the present application relates to an EAS device that uses at least one elastic band to monitor attachment of the EAS device to a box or other item.

BACKGROUND OF THE INVENTION

Theft in retail establishments is a consistent problem. There are numerous systems for preventing theft. In general, the systems consist of setting up an electronic article surveillance (EAS) monitoring system of antennas, computers, etc. for an area that is to be controlled. Electronic article surveillance (EAS) devices are attached to objects that are desired to be protected. The EAS systems generate interrogation fields to elicit responses from the EAS devices on the protected objects. In their simplest embodiments, the EAS devices comprise passive EAS elements that are capable of generating response signals when exposed to interrogation fields.

Typically, the interrogation fields are generated at the exits of the controlled area. The interrogation fields are generated intermittently. When a passive EAS element is in an active interrogation field, the interrogation field generates energy in the passive elements. When the interrogation field turns off, this energy dissipates and generates a signal. The EAS system monitors for signals while the EAS interrogation field is off. If a signal is detected by the EAS system, the EAS system evaluates that signal as indicating that an EAS device, and the item to which it is attached, is in the zone monitored by the interrogation field. The EAS system may then generate an alarm. Through convention and regulation, EAS systems operate at discrete common frequencies.

More sophisticated EAS devices may have elements of memory and logic. These more sophisticated devices can store information, communicate information with the EAS system, be reprogrammed, monitor the integrity of the EAS device, etc. There are a wide variety of methods of attaching EAS devices to a product that is desired to be protected from theft. Both the attaching method and the communication system of an EAS device may be attacked to effect the theft of an item.

Some EAS devices are attached to a box or carton containing a product by elements that wrap around the box. These wrapping elements may be permanently a part of the EAS device, or they may be separable elements and disposable. When the wrapping elements are disposable, the rest of the EAS device that contains the electronics is reusable with the supply of new wrapping elements to attach the EAS device to the next box.

Relevant Art

U.S. Pat. No. 7,522,048 by Belden, Jr. is for "BANDING CLIP ALARM". A security alarm is removably attached to a band extending about a package which sounds an alarm should tension on the band be reduced, to prevent theft of the package contents. The band extends through a passage formed between the bottom of an alarm housing and a bottom lock plate pivotally connected to the housing. A plunger switch is mounted in the housing and engages the band. Reduction of the band tension permits the switch plunger to move and actuate an audible alarm. A slide lock attaches the bottom lock plate to the alarm housing to prevent removal of the alarm from the band. A key unlocks the slide lock from the alarm housing enabling the alarm to be slid from beneath the band.

U.S. Pat. Nos. 8,305,219 and 8,368,542 by Yang are for "EAS tag using tape with conductive element". An electronic article surveillance apparatus for monitoring large objects is comprised of a base, at least one segment of tape, and an electronics housing. The segment of tape has at least one electrically conductive element running the length of the tape. The base rests on an object to be monitored, and the housing releasably latches onto the base, while each tape segment wraps around the object with each end of tape segment being fixed between the base and housing. Electronics within the housing complete a circuit through each tape segment and monitors the tape segments for electrical continuity. If electrical continuity is lost, either by cutting a tape segment, or unauthorized unlatching of the housing, an alarm can be sounded by the electronics within the housing. The electronic housing may be disarmed by a remote device and unlatched from the base. Both base and tape segments may have adhesive elements.

U.S. Pat. No. 8,373,565 by Yang is for "Security apparatus with conductive ribbons". An electronic article surveillance (EAS) security apparatus is comprised of a housing, base plate, ribbon pad, and electrically conductive ribbons. In one embodiment, the ribbons are pre-attached to the ribbon pad and extend from the ribbon pad. The ribbon pad and base plate are installed on opposite sides of an object to be protected. The ribbons are extended around the object, and their extended ends attached to the base plate. The housing has electrical contacts and encloses electronics. It is attached to the base plate in such a way that the electrical contacts complete circuits through the ribbons. The electronics in the housing monitors the ribbons to detect unauthorized removal of the apparatus. A switch on the bottom of the housing detects that the housing is attached to a plate and object. The apparatus has a locking mechanism to maintain the housing and plate together, which can be released by application of a magnet.

U.S. Pat. No. 9,404,291 by White, et al. is for "DEVICE AND METHOD FOR AN ALARMING STRAP TAG". In White, a security device may include a rotatable cap and an engagement member. The cap may be graspable by an operator during attachment of the security device to at least a first strap extending substantially around a portion of an object. The engagement member may be configured to engage the first strap. The engagement member may also be substantially fixed in relation to the cap during the attachment of the security device to the first strap and the engagement member may be rotatable with the cap. The security device may be transitioned to a locked state responsive to rotational engagement of the engagement member with the first strap. The rotational engagement of the engagement member with the first strap may also increase tension on the first strap.

U.S. Pat. No. 9,965,933 by Schneider, et al. is for "Product strap detection apparatus and method". In Schneider, a security device for detecting product straps may include a base, and a pivot member affixed to the base via a first hinge. The pivot member may be configured to physically engage a strap to maintain the pivot member in a non-deflected position. The security device may further include a biasing member configured to urge the pivot member into a deflected position and a sensor configured to detect when the pivot member is in the deflected position. The sensor may be configured to, in response to detecting that the pivot member is in the deflected position, generate an alert signal. The security device may also include processing circuitry configured to receive the alert signal and, in response to receiving the alert signal, transmit an alert triggering signal to initiate an alert.

SUMMARY OF EMBODIMENTS OF THE INVENTION

Embodiments of the present electronic article surveillance (EAS) device have an electronics housing and an elastic band. The elastic band stretches around an item to be protected and holds the housing to the item. One end of the elastic band is fixed with respect to the housing, while the other end inserts into the housing through an aperture. The inserted end of the elastic band is attached within the housing. A tension monitoring apparatus within the housing monitors the state of tension in the band.

In some embodiments, the tension monitoring apparatus employs a cantilevered lever arm. The cantilevered lever arm extends into the path between the aperture and the inserted end of the elastic band where it is anchored. When there is relatively light tension, or no tension, in the band, the cantilevered lever arm has sufficient stiffness to maintain an initial position and displace the band from the path between the aperture and anchored end of the band. When sufficient tension is induced in the band, the band displaces the cantilevered lever arm from its initial position to a different position. Tension may be induced in the band by stretching the band around an item to install the EAS device on the item. A sensor in the housing monitors the position of the cantilevered lever arm and generates a signal to communicate the position of the cantilevered lever arm. In some embodiments, the sensor is a switch which may have its state changed by movement of the cantilevered lever arm. In other embodiments, the tension monitoring apparatus employs a moveable element and a bias element biasing the moveable element to an initial position. The inserted end of the band attaches to the moveable element. When tension is induced in the band, the band moves the moveable element from its initial position. A sensor monitors the moveable element and generates a signal based on the position of the moveable element. In some embodiments, the moveable element may be rotatable about a pivot. In other embodiments, the moveable element may be a sliding element within guides.

The tension monitoring apparatus generates a signal based upon the state of tension in the band. Other electronics within the housing use this signal to determine whether the elastic band has tension in it, and whether an alarm condition exists. If an alarm condition exists, the electronics can generate various alarms such as wireless alarms, audible alarms, or visible alarms.

In some embodiments employing the cantilevered lever arm, the sensor and the cantilevered lever arm may be in a sensor assembly together. The sensor may have a body and the cantilevered lever arm may be fixed to the body of the sensor. The sensor assembly is then positioned within the housing to extend the cantilevered lever arm into the path between the aperture in the housing and the second end of the band. The sensor monitors the position of the cantilevered lever arm. In some embodiments, the sensor is a switch which may have its state change by movement of the cantilevered lever arm.

Some embodiments of the EAS device may employ additional sensors or switches. Some embodiments have an aperture through the surface of the housing that is intended to contact the item to be protected. A switch extends through this contact surface. When the EAS device is attached to an item and the contact surface contracts the item, the switch changes state. This change in state is communicated to the electronics within the housing and is an additional indication that the EAS device is attached to an item. Some embodiments may also have an arming switch. This arming switch is manually actuated just before the EAS device is installed on an object which generates an additional signal to electronics within the housing.

The electronic housing of the EAS device may have several components within it, including: a microprocessor, a circuit board, a battery, an EAS core and coil element, the switches referenced above, a sound producing device, and wireless communication elements such as radio frequency communication elements or an infrared communication port and a light emitting diode. The microprocessor or circuit board can detect the state of the switches and other circuit elements. The microprocessor or circuit board executes machine executable instructions based on these inputs to determine whether the EAS device has been installed, whether to arm, whether the elastic bands have been tampered with, whether an alarm condition exists, and how to respond to a given set of states. When initially installed on an item, the EAS device may be armed with an external arming device that communicates with the device via the infrared communication port, radio frequency communications, or other communication elements, or the electronics may arm based simply upon installation of the EAS device on an item.

Once an EAS device is assembled and armed, unauthorized removal of the device is detected by the onboard electronics which sense an alarm condition via changes in state of any conditions required to arm the EAS device, such as changes to the states of switches. In one case, if the EAS device is removed from an item, the switch extending from the housing will lose its contact with the item to which the EAS device is attached. In another case, if the elastic band is severed or otherwise relaxed, the cantilevered lever arm will move toward its initial position. In either case, the change in state of the switches will send signals to the other electronics of the EAS device, which may determine that an alarm condition exists. In response to a detected alarm condition, the electronics can generate an alarm, including onboard audible alarms, or alarms communicated to the EAS system via infrared signals, radio frequency signals, or other communication methods.

Some embodiments of the EAS device may respond to tampering in a step-wise manner. For example, if the housing of the EAS device is pulled away from the surface of the item, this would change the state of the switch extending through the contact surface of the EAS device. In response, the EAS device may produce audible beeps and or visible flashes to encourage cessation of tampering. If the EAS device is completely removed from an item, this would remove tension from the elastic band and allow the cantilevered lever arm to assume its initial position. The sensor monitoring the cantilevered lever arm would send the appropriate signal, and the electronics could communicate an alarm with its wireless communication elements and generate alarms with its sound generator and LED.

Disarming of the EAS device may be accomplished by authorized personnel. An authorized person having access to other elements of the broader EAS system such as a hand held communication device or a base station having communication capabilities may disarm the device. Some embodiments will add another element of security with passcode capabilities in the respective electronics. The EAS device electronics of these embodiments are capable of storing a passcode which is known to the communication elements of the EAS system and which can be used to confirm to the EAS device that the disarming signal is authorized. If an EAS device is detached without being disarmed with the appropriate passcode, the EAS device will detect an alarm condition and respond as programmed.

BRIEF DESCRIPTION OF DRAWINGS

Additional utility and features of the invention will become more fully apparent to those skilled in the art by reference to the following drawings, which illustrate some of the primary features of preferred embodiments.

DETAILED DESCRIPTION OF EMBODIMENTS OF THE INVENTION

Figure 1:
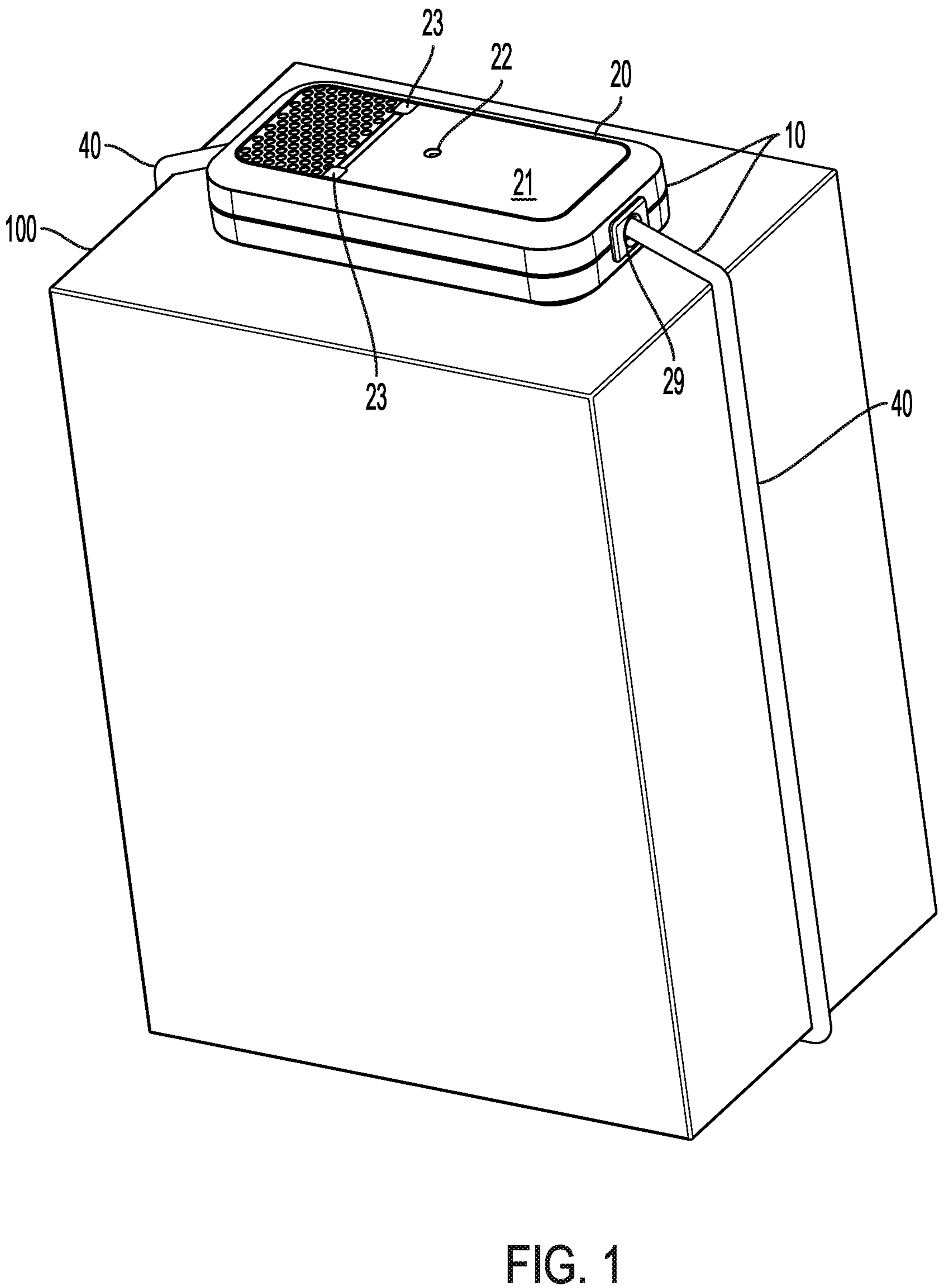
FIG. 1 is a top perspective view of an embodiment of an EAS device with elastic band attached to a box to be protected.
Figure 2:
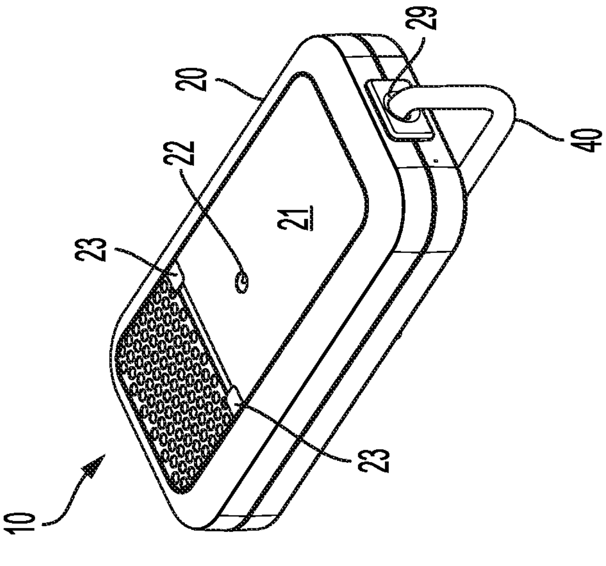
FIG. 2 is a top perspective view of an embodiment of an EAS device with elastic band.

FIG. 1 is a top perspective view of an embodiment of an EAS device with elastic band 10 attached to a box 100 to be protected. EAS device 10 is comprised of a housing 20 and an elastic band 40. Elastic band 40 maintains housing 20 and elastic band 40 on an object to be protected such as box 100. Elastic band 40 has at least enough elasticity to reach around box 100 and maintain the bottom, contact, surface of housing 20 in contact with box 100. The top surface 21 of housing 20 has a sound aperture 22 in which allows audible signals generated by EAS device 10 to more easily pass from the interior space of housing 20. Top surface 21 of housing 20 also has windows 23 which allow for optical communication with the electronic circuitry within housing 20. FIG. 2 is a top perspective view of an embodiment of an EAS device with elastic band 10. Since EAS device 10 is not attached to an item, such as box 100, band 40 does not have any tension in it. Sound aperture 22 and windows 23 may also be seen in top surface 21 in FIG. 2.

Figure 3:
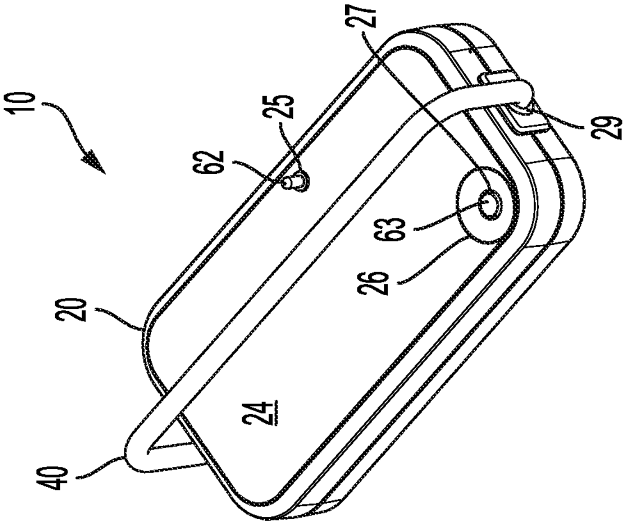
FIG. 3 is a bottom perspective view of an embodiment of an EAS device with elastic band.

FIG. 3 is a bottom perspective view of an embodiment of an EAS device with elastic band 10. Again, since EAS device 10 is not attached to an item to be protected, band 40 does not have any tension in it. Bottom surface 24 is the surface of housing 20 that contacts items to be protected, such as box 100 of FIG. 1. In the embodiment of FIG. 3, bottom, or contact, surface 24 of housing 20 has two apertures in it associated with sensors. A first, sensor, aperture 25 allows an installation sensor 61 in the interior of housing 20 (see FIG. 7) to monitor the installation status of housing 20 based on the housing's contact with an object. In the embodiment of FIG. 3, installation sensor 61 is a plunger switch 61 having a plunger 62 extending through sensor aperture 25. When EAS device 10 is installed on an object with bottom surface 24 contacting the object, plunger 62 is depressed into housing 20. This changes the state of plunger switch 61, which generates a signal indicating the change in state of plunger switch 61. Electronics within housing 20 receive this signal as an input to be analyzed to determine the status of EAS device 10. Alternatively, if EAS device 10 is removed from an object to which it has previously been attached, installation sensor 61, or plunger switch 61, will generate a signal which is received as an input by electronics within housing 20 to determine the status of EAS device 10. In the embodiment of FIG. 3, bottom surface 24 has recess 26. Arming aperture 27 is located in recess 26 in bottom surface 24 of housing 20 and provides access to arming switch 63. Recess 26 allows arming switch 63 to be concealed on the underside of an installed EAS device 10 without arming switch 63 being contacted by the surface of the object on which EAS device 10 is installed. When EAS device 10 is about to be installed on an object, arming switch 63 may be pressed to generate an arming signal as an initial input to the electronics within housing 20. That initial input signal along with the input from installation sensor 61 are part of the set of inputs that the electronics within housing 20 will evaluate to determine whether EAS device 10 has been installed on an object such as object 100. The electronics will also receive an input based on whether band 40 has tension in it and may also receive an input from an external device.

Figure 4:
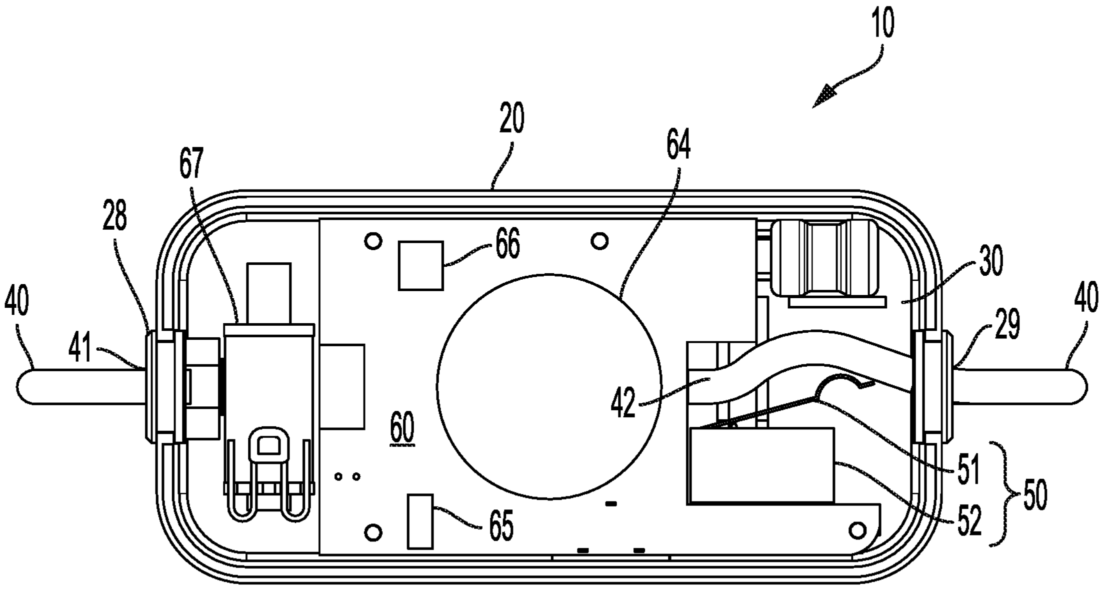
FIG. 4 is a top view of an embodiment of an EAS device with elastic band with the top of the housing removed and without tension in the elastic band.
Figure 5:
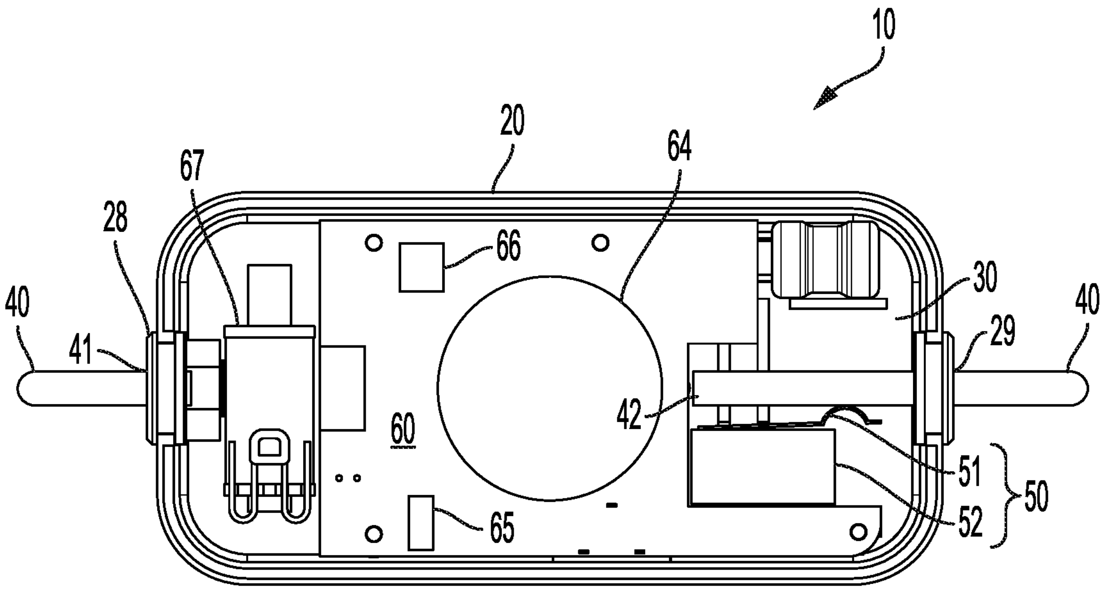
FIG. 5 is a top view of an embodiment of an EAS device with elastic band with tension in the elastic band.

FIG. 4 is a top view of an embodiment of an EAS device with elastic band 10 with the top of housing 20 removed and without tension in band 40. FIG. 5 is a top view of an embodiment of an EAS device with elastic band 10 with tension in the elastic band 40. At the left in these figures, a first end 41 of elastic band 40 is fixed with respect housing 20. First end 41 may be fixed at first block 28 or first end 41 may insert through an aperture in first block 28 into the interior space of housing 20 where it is fixed. At the right end of housing 20, a second end 42 of band 40 inserts through band aperture 29 in housing 20 into the interior space 30 of housing 20 where it is attached and held in fixed location.

Both FIGS. 4 and 5 show an embodiment of a tension monitoring apparatus 50 being employed. The embodiment of tension monitoring apparatus 50 employed in FIGS. 4 and 5 comprises a cantilevered lever arm 51 and a position sensor 52 monitoring the position of cantilevered lever arm 51.

Referring now only to FIG. 4, band 40 does not have any tension in it. Cantilevered lever arm 51 is positioned to extend between band aperture 29 and second end 42 of band 40. When band 40 does not have any tension in it, cantilevered lever arm 51 is sufficiently stiff to maintain its initial position and displace band 40 from a direct path between band aperture 29 and where second end 42 of band 40 is fixed. Position sensor 52 is located proximal to cantilevered lever arm 51 to monitor the position of cantilevered lever arm 51.

Referring now to FIG. 5, band 40 has tension in it caused by, for example, EAS device 10 being installed on an object and band 40 being extended around the object. In FIG. 5, the tension in band 40 has drawn band 40 into a direct line from second end 42 of band 40 to band aperture 29, and band 40 has displaced cantilevered lever arm 51 from its initial position. Position sensor 52 detects this movement of cantilevered lever arm 51 from its initial position and position sensor 52 generates a signal communicating this change in position. Electronics within housing 20 monitor position sensor 52 and receive this signal from position sensor 52 as an input signal and may interpret the signal as indication that tension has been induced in band 40. The electronics housing 20 use the position signal of position sensor 52 for cantilevered lever arm 51 as one of the inputs used to evaluate the status of EAS device 10.

Figure 6:
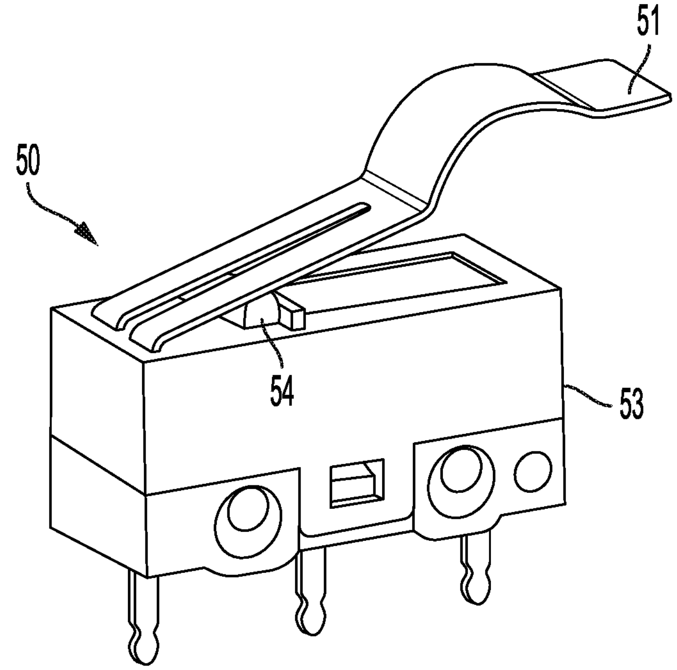
FIG. 6 is a perspective view of an embodiment of a tension sensing apparatus.

In some embodiments of tension monitoring apparatus 50, position sensor 52 may be a switch physically actuated by the movement of cantilevered lever arm 51. FIG. 6 is a perspective view of an embodiment of a tension monitoring apparatus 50. In FIG. 6, tension monitoring apparatus 50 has a spring loaded switch enclosed in a switch housing 53 with a switch actuator 54 extending from switch housing 53. Cantilevered lever arm 51 is fixed to switch housing 53 in a location such that when cantilevered lever arm 51 is moved from its initial position, it will contact and move switch actuator 54 which actuates the switch in switch housing 53 of tension monitoring apparatus 50. Other embodiments of tension monitoring apparatus 50 may employ proximity sensors, magnetic switches, optical sensors, etc., as the position sensor, rather than a spring loaded switch.

Returning to FIGS. 4 and 5, circuit board 60 is centrally located within housing 20 and provides the mount for several electronic elements. Sound generator 64 in the middle of housing 20 produces audible signals and is positioned beneath sound aperture 22 when housing 20 is fully assembled. In some embodiments, sound generator 64 may actually be mounted directly to top portion of housing 20 rather than circuit board 60. Light emitting diode (LED) 65 on circuit board 60 produces optical signals and is located on circuit board 60 such as to align with one of windows 23 so that it is signals are visible external of housing 20. Optical communication port 66 receives optical signals and is located on circuit board 60 such as to align with the other window 23. Optical communication port 66 may be a photodiode, or other optical sensors could also be employed as Optical communication port 66. LED 65 and Optical communication port 66 combine to provide optical wireless communication for EAS device 10. Frequently, optical wireless communication occurs in the infrared range of the light spectrum. Passive electronic article surveillance (EAS) element 67 is located at the left in both figures. Passive EAS element 67 responds with a signal when subjected to a cycling interrogation field in an EAS system.

Figure 7:
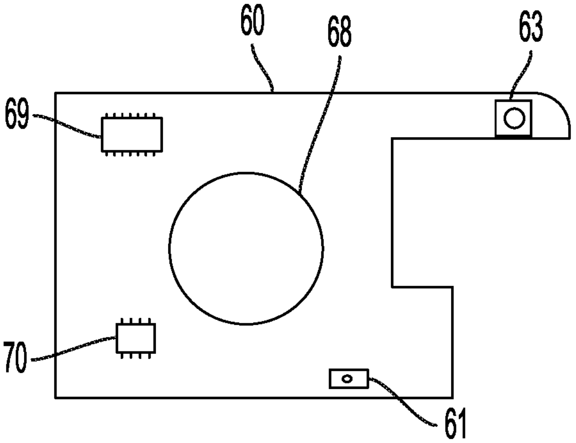
FIG. 7 is a bottom view of an embodiment of a circuit board for an embodiment of an EAS device with elastic band.

FIG. 7 is a bottom view of an embodiment of a circuit board 60 for an embodiment of an EAS device with elastic band 10. Battery 68 is centrally located on circuit board 60 and provides an onboard power supply for EAS device 10. Processor 69 executes machine readable instructions to analyze inputs from various sensors to determine the status of EAS device 10 with respect to whether it is installed, armed, disarmed, being tampered with, etc. Radio chip 70 has transmitting and receiving capabilities and provides EAS device 10 with wireless radio communication. Installation sensor 61 aligns with sensor aperture 25 in the bottom, contact, surface 24 of housing 20 (See FIG. 3). Arming switch 63 aligns with arming aperture 27 in the bottom, contact, surface 24 of housing 20 (see FIG. 3).

Processor 69 receives inputs from the several sensors and drives the various communication elements. In the embodiment shown in FIG. 3, when EAS device 10 is being installed on an object, arming switch 63 is pressed as an initial input to processor 69. When EAS device 10 is installed on an object with bottom surface 24 of housing contacting the object, installation sensor 61 has its state changed, and this generates another input to processor 69. Band 40 maintains bottom surface 24 in contact with the object and maintains the state of installation sensor 61 until EAS device 10 is removed from the object. Additionally, when EAS device 10 is installed on an object, band 40 is placed in tension, and position sensor 52 of tension monitoring apparatus 50 generates a signal indicating that band 40 is in tension. This is an additional input for processor 69 to monitor and interpret. When processor 69 has received the correct values of various inputs, processor 69 determines that EAS device 10 has been installed and arms EAS device 10. Once EAS device 10 is armed, it must first be disarmed to allow its removal while avoiding EAS device 10 generating alarms. An external device may be used to wirelessly communicate with EAS device 10 to disarm it. This may be accomplished via the radio frequency wireless communication elements in EAS device 10 or the optical wireless communication elements in EAS device 10. This external device might be a hand held device for example. In some embodiments of EAS device 10 and EAS systems, the external device may be used in an additional last step to finalize the arming of EAS device 10 via the wireless communication elements of EAS device 10, i.e. once arming switch 63 and installation sensor 61 have been actuated and position sensor 52 indicates tension in band 40, an external device may wirelessly confirm installation of EAS device 10 and communicate an arming signal.

Once EAS device 10 has been installed and processor 69 has received all of the inputs confirming that, processor 69 monitors these input signals for changes and responds as programmed. For example, if housing 20 of EAS device 10 is lifted from the item sufficiently to change the state of installation sensor 61, processor 69 detects that change and operates sound generator 64 to issue a warning sound. If EAS device 10 is completely removed without it being disarmed, this will release the tension from band 40 which will be detected by position sensor 52 and change the respective input to processor 69. With those changes in the inputs, processor 69 determines that EAS device 10 has been removed without authorization, since EAS device 10 has not been previously disarmed. Having determined that an alarm condition exists, processor 69 can operate several elements of EAS device 10 to generate alarms. Processor 69 may drive sound generator 64 to generate audible alarms effective in the vicinity of EAS device 10. Processor 69 may also use the wireless communication elements of EAS device 10 to generate wireless alarm signals. Both LED 65 and radio chip 70 can send wireless signals to the broader EAS system which then may respond with system alarms such as area-wide audible alarm and electronic notification of personnel, etc. It should be noted at this time, that with respect to the discussion of signals and inputs, for the purposes of logic performed by processor 69, a change from no signal being present to a signal being present is equivalent to a change of a signal being present to no signal being present.

Figure 8:
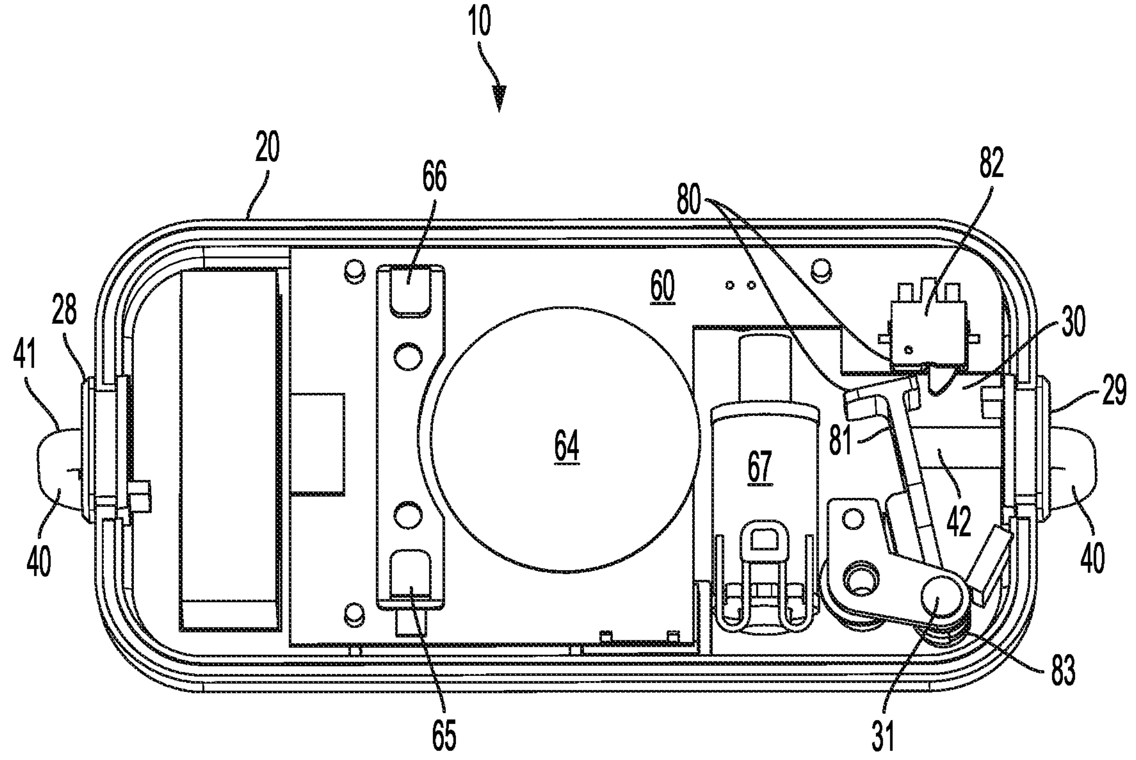
FIG. 8 is a top perspective view of an embodiment of an EAS device with elastic band with the top of the housing removed.
Figure 9:
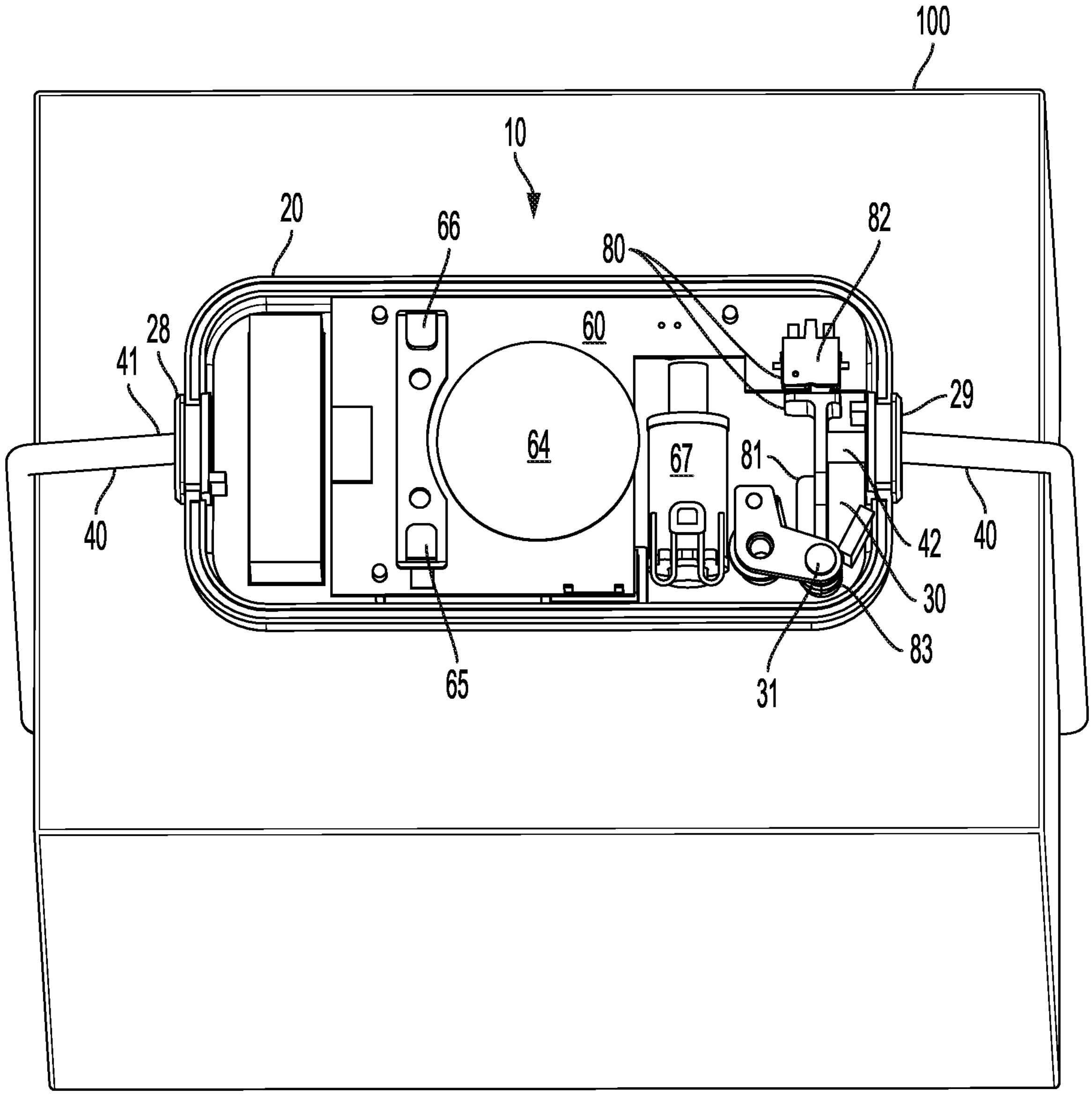
FIG. 9 is a top perspective view of an embodiment of an EAS device with elastic band attached to a box and with the top of the housing removed.

FIG. 8 is a top perspective view of an embodiment of an EAS device with elastic band 10 with the top of housing 20 removed. FIG. 9 is a top perspective view of an embodiment of an EAS device with elastic band 10 attached to a box 100 and with the top of housing 20 removed. The embodiments of EAS device 10 in FIGS. 8 and 9 employ a different embodiment of a tension monitoring apparatus 80. In these embodiments, tension monitoring apparatus 80 comprises moveable element 81, bias element 83, and position sensor 82. Moveable element 81 is pivotably mounted at pivot 31. Bias element 83 biases moveable element 81 to an initial position. Position sensor 82 monitors the position of moveable element 81 and communicates that position to processor 69. Second end 42 of band 40 inserts through band aperture 29 into interior space 30 of housing 20 and attaches to moveable element 81. When band 40 does not have tension in it, bias element has sufficient strength to keep moveable element 81 in its initial position. Referring now to FIG. 9, when EAS device 10 is installed on an object, such as box 100, by extending band 40 around the object, tension is induced in band 40. This tension in band 40 is sufficient to overcome bias element 83 and move moveable element 81 from its initial position. Position sensor 82 detects this change in position and communicates it to processor 69 which can interpret the communication as indicating that band 40 has tension in it. As discussed with respect to tension monitoring apparatus 50 of FIGS. 4 and 5, processor 69 uses the communication from position sensor 82 to evaluate the status of EAS device 10. Although moveable element 81 in FIGS. 8 and 9 is pivotably mounted as at pivot 31, moveable element 81 could be constrained by other methods to move to and from an initial position. For example, a moveable element could be a sliding element constrained by guides to move in a defined path.

Figure 10:
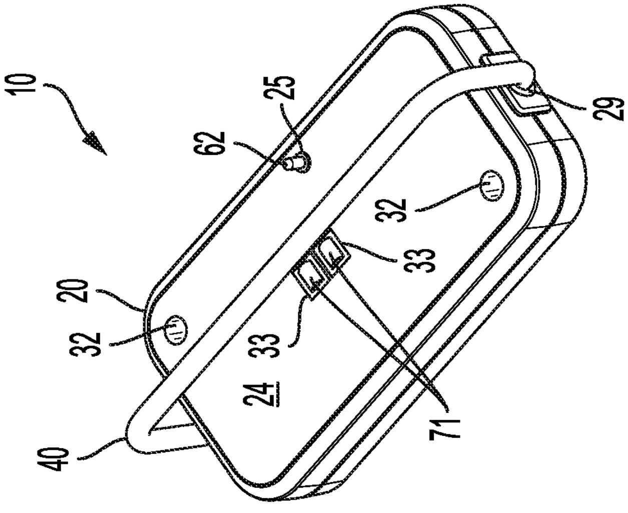
FIG. 10 is a bottom perspective view of an embodiment of an EAS device with elastic band adapted to receive a spring biased plate.

FIG. 10 is a bottom perspective view of an embodiment of an EAS device 10 with elastic band 40 adapted to receive a spring biased plate. Since EAS device 10 is not attached to an item to be protected, band 40 does not have any tension in it. As with the embodiment of FIG. 3, the embodiment of FIG. 10 has a sensor aperture 25 through bottom surface 24 with an installation sensor 61 that is located at sensor aperture 25 and in electrical continuity with electronics within housing 20. The embodiment of FIG. 10 has additional apertures in bottom surface 24. Assembly apertures 32 in bottom surface 24 facilitate the mounting of a spring biased plate to housing 20, and contact apertures 33 provide external exposure for electrical contacts 71, which have electrical continuity with the electronics within housing 20

Figure 11:
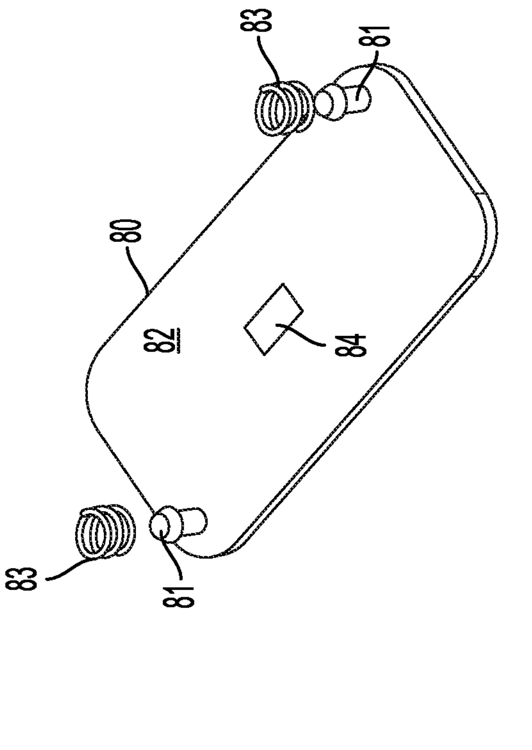
FIG. 11 is a top perspective view of an embodiment of a spring biased plate of an EAS device.

FIG. 11 is a top perspective view of an embodiment of a spring biased plate 85 of an EAS device 10. Plate 85 has assembly posts 86 extending upward from its top surface 87. Referring back to FIG. 10, assembly posts 86 and assembly apertures 32 are sized and configured such that assembly posts 86 can be inserted into assembly apertures 32 and retained. Springs 88 fit over assembly posts 86 and interpose between bottom surface 24 of housing 20 and top surface 87 of plate 85.

Figure 12:
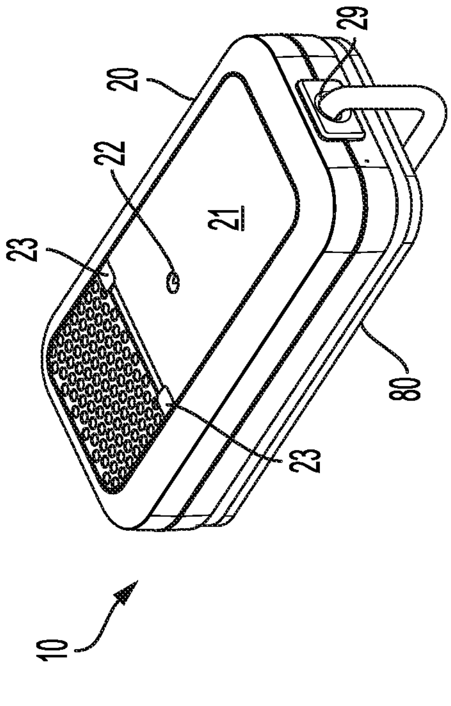
FIG. 12 is a top perspective view of an embodiment of an EAS device with elastic band also incorporating a spring biased plate.

FIG. 12 is a top perspective view of an embodiment of an EAS device 10 with elastic band 40 also incorporating a spring biased plate 85. In FIG. 12, a plate, such as plate 85 in FIG. 11, is assembled to a housing, such as housing 20 in FIG. 10. Springs 88 bias plate 85 away from housing 20, creating a space when EAS device 10 is not installed on a box or other object. When EAS device 10 is installed on an object by orienting plate 85 toward the object and stretching band 40 around the object, plate 85 is compressed against bottom surface 24 of housing 20. Installation sensor 61 detects the compressed position of plate 85 and generates a signal as an input for the electronics within housing 20. The electronics receive the signal as at least one indication that EAS device 10 is installed. When the appropriate parameters for installation of EAS device 10 are met, the electronics may arm such that any unauthorized removal of EAS device 10 will cause an alarm condition. Plate 85 improves the operation of EAS device 10 on objects having irregular surfaces or soft surfaces. Plate 85 provides a reliable surface for installation sensor 61 to monitor. In the embodiment of FIG. 10, installation sensor 61 is a switch employing a plunger 62 extending through sensor aperture 25.

Returning to FIGS. 10 and 11, circuit closer 89 in plate 85 is positioned to align with both electrical contacts 71 in contact apertures 33. Circuit closer 89 is electrically conductive. When EAS device 10 is installed on an object by orienting plate 85 toward the object and stretching band 40 around the object, plate 85 is compressed against bottom surface 24 of housing 20. When plate 85 is compressed, circuit closer 89 contacts both electrical contacts 71, which have electrical continuity with the electronics within housing 20. This completes an electrical circuit which generates a signal as an input for the electronics within housing 20. The electronics receive the signal as at least one indication that EAS device 10 is installed. When the appropriate parameters for installation of EAS device 10 are met, the electronics may arm such that any unauthorized removal of EAS device 10 will cause an alarm condition which causes alarms to be generated.

Figure 13:
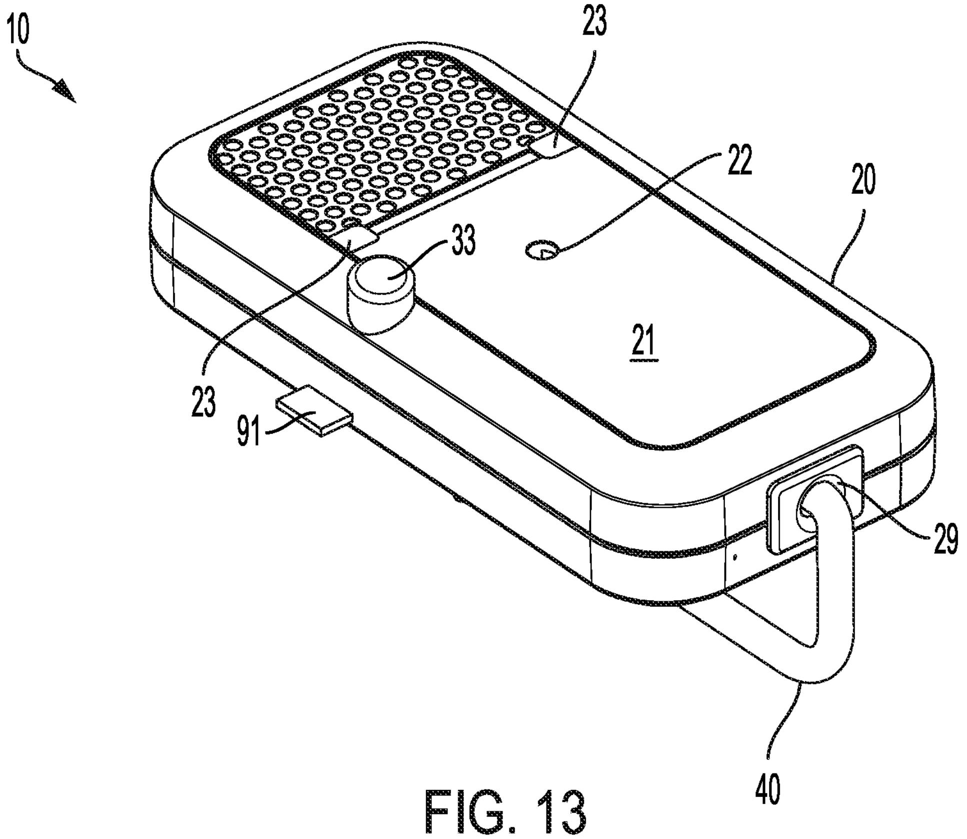
FIG. 13 is a top perspective view of an embodiment of an EAS device with elastic band also having an arming mechanism.
Figure 14:
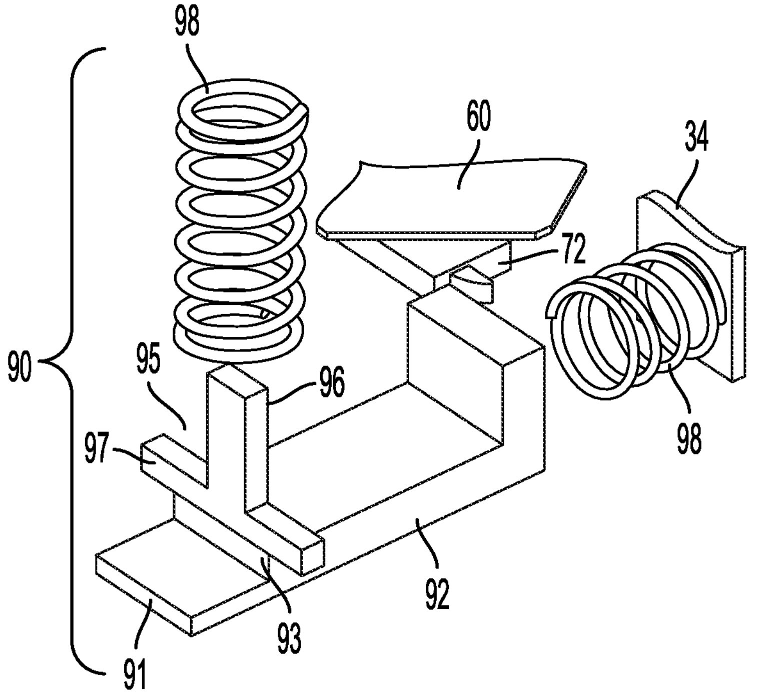
FIG. 14 is a top perspective view of an embodiment of an arming mechanism for an EAS device with elastic band.

FIG. 13 is a top perspective view of an embodiment of an EAS device 10 with elastic band 40 also having an arming mechanism as evidenced by button 91 and dome 33. FIG. 14 is a top perspective view of an embodiment of an arming mechanism 90 for an EAS device 10. Button 91 is a part of slide 92. Slide 92 is biased to a forward position by return spring 98. When slide 92 is in the forward position, button 91 extends from housing 20 as shown in FIG. 13. Backstop 34 backs return spring 98, and may, in some embodiments be the wall of housing 20. Latch switch 72 is mounted to circuit board 60 in proximity to the back of slide 92. When button 91 is pressed, slide 92 moves back and makes contact with latch switch 72, which changes the state of latch switch 72. This generates an input signal to the electronics within housing 20. This signal is a least one of the signals that indicate that EAS device 10 is installed and armed, such as in combination with a signal from installation sensor 61.

Arming mechanism 90 latches to hold latch switch 72 in its changed state. In the embodiment of FIG. 14, this is accomplished by step 93 in slide 92, t-shaped blocker 95, and latch spring 99. Blocker 95 has a stem 96 and t-arms 97. Latch spring 99 fits over stem 96 of blocker 95 and presses on t-arms 97. Both latch spring 99 and stem 96 fit within dome 33 of housing 20. When slide 92 is in the forward position, blocker 95 rests on the top of slide 92. When button 91 is pressed, slide 92 moves back, and blocker 95 is driven down onto button 91. Because of step 93, slide 92 is prevented from returning by blocker 95. This holds the state of latch switch 72.

Arming mechanism 90 may be released to disarm EAS device 10 before it is removed. Blocker 95 is at least partially comprised of a magnetically attractable material. Application of a magnet to dome 33 lifts blocker 95 and allows slide 92 to move to the forward position, where button 91 again fully extends from housing 20. This releases latch switch 72, which changes the input signals to the electronics within housing 20. Depending on the programming of the electronics within housing 20, the change in input signal may result in the EAS tag 10 disarming. Although a particular embodiment of the arming mechanism is shown in FIGS. 13 and 14, other embodiments may be employed to arm an EAS device 10.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

I claim:

1. An electronic article surveillance (EAS) device comprising:

a housing having a first aperture through it;

a band having a first end anchored to the housing and a second end inserted into the housing through the first aperture, the second end being anchored within the housing;

a cantilevered lever arm extended between the first aperture in the housing and the second end of the band, wherein when sufficient tension is induced in the band, the band displaces the cantilevered lever arm;

a first sensor in the housing, the first sensor monitoring the position of the cantilevered lever arm and communicating the position of the cantilevered lever arm; and, electronics within the housing, the electronics interpreting the communication from the first sensor to determine if an alarm condition exists.

2. The EAS device of claim 1, further comprising:

an external contact surface on said housing and a second aperture through the contact surface; and, a second sensor within the housing, the second sensor being aligned with the second aperture, the second sensor monitoring whether the contact surface of the housing is in contact with an item, the second sensor communicating whether the contact surface of the housing is in contact with an item, the electronics in the housing interpreting the communication from the second sensor to determine if an alarm condition exists.

3. The EAS device of claim 2, wherein:

wherein at least one of the first sensor and the second sensor is a switch.

4. The EAS device of claim 1, wherein:

the band is an elastic band.

5. The EAS device of claim 1, wherein;

the electronics within the housing comprise a microprocessor, wireless communication elements, and a power supply, the wireless communication elements being capable of generating a wireless signal.

6. The EAS device of claim 5, wherein;

the electronics within the housing further comprise a sound generator, the sound generator being capable of generating an audible signal.

7. The EAS device of claim 5, wherein:

the wireless communication elements comprise radio frequency communication circuitry.

8. The EAS device of claim 5, wherein:

the wireless communication elements comprise optical communication elements.

9. The EAS device of claim 1, wherein:

the first sensor comprises a body and said cantilevered lever arm is fixed to the body of the first sensor.

10. The EAS device of claim 1, further comprising:

an arming switch in the housing; and, an arming aperture in the housing, the arming switch being located in the housing to be accessible at the arming aperture.

11. The EAS device of claim 1, further comprising;

a passive EAS element in the housing.

12. An electronic article surveillance (EAS) device comprising:

a housing enclosing an interior space and having a first aperture through it;

a band having a first end fixed with respect to the housing and a second end inserted through the first aperture into the interior space and anchored therein;

a cantilevered lever arm within the interior space, the cantilevered lever arm having an initial position extending between the first aperture and the second end of the band, wherein when sufficient tension is induced in the band, the cantilever lever arm is displaced from its initial position between the first aperture and the second end of the band; and, a first sensor in the interior space of the housing, the first sensor monitoring the position of the cantilevered lever arm and communicating the position of the cantilever lever arm with a signal.

13. The EAS device of claim 12, further comprising:

a processor in the interior space of the housing, the processor monitoring the signal from the first sensor and executing machine readable instructions to determine whether an alarm condition exists.

14. The EAS device of claim 13, further comprising:

wireless communication elements in the housing, the processor using the wireless communication elements to send and receive communications with devices external to the EAS device.

15. The EAS device of claim 14, wherein:

the wireless communication elements comprise radio frequency communication circuitry.

16. The EAS device of claim 14, wherein:

the wireless communication elements comprise optical communication elements.

17. The EAS device of claim 13, further comprising:

a sound generator in the housing, the processor using the sound generator to generate audible signals.

18. The EAS device of claim 13, further comprising:

an external contact surface on said housing and a second aperture through the contact surface; and, a second sensor within the housing, the second sensor being aligned with the second aperture, the second sensor monitoring whether the contact surface of the housing is in contact with an item, the second sensor communicating whether the contact surface of the housing is in contact with an item, the microprocessor interpreting the communication from the second sensor to determine if an alarm condition exists.

19. The EAS device of claim 13, wherein:

the band is an elastic band.

20. The EAS device of claim 13, further comprising:

an arming switch in the housing; and, an arming aperture in the housing, the arming switch being located in the housing to be accessible at the arming aperture.

21. An electronic article surveillance (EAS) device comprising:

a housing enclosing an interior space and having a first aperture through it;

a band having a first end fixed with respect to the housing and a second end inserted through the first aperture into the interior space and attached therein;

a tension monitoring apparatus within the interior space of the housing, the tension monitoring apparatus monitoring whether the band is under tension and generating a signal indicating the tension status of the band; and, circuitry within the interior space configured to monitor the signal from the tension monitoring apparatus and to determine when an alarm condition exists.

22. The EAS device of claim 21, wherein:

the second end of the band is fixed within the interior space of the housing; and, the tension monitoring apparatus comprises, a cantilevered lever arm within the interior space, the cantilevered lever arm having an initial position extending between the first aperture and the second end of the band, wherein when sufficient tension is induced in the band, the cantilever lever arm is displaced from its initial position between the first aperture and the second end of the band; and, a first sensor in the interior space of the housing, the first sensor monitoring the position of the cantilevered lever arm and generating the signal indicating the tension status of the band based on the position of the cantilever lever arm.

23. The EAS device of claim 21, wherein:

the tension monitoring apparatus comprises, a moveable element within the housing;

a biasing element within the housing, the biasing element urging the moveable element to an initial position; and, a first sensor in the housing, the first sensor monitoring whether the moveable element is in the initial position and communicating the position of the moveable element; wherein, the second end of the band is connected to the moveable element within the housing and when sufficient tension is induced in the band, the band urges the moveable element from the initial position and the first sensor generates a signal indicating the tension status of the band based on the position of the moveable element.

24. The EAS device of claim 21, wherein:

the circuitry comprises a processor in the interior space of the housing, the processor executing machine readable instructions to determine whether an alarm condition exists.

25. The EAS device of claim 24, further comprising:

wireless communication elements in the housing, the processor using the wireless communication elements to send and receive communications with devices external to the EAS device.

26. The EAS device of claim 24, further comprising:

a sound generator in the housing, the processor using the sound generator to generate audible signals.

27. The EAS device of claim 24, further comprising:

an external contact surface on said housing and a second aperture through the contact surface; and, a second sensor within the housing, the second sensor being aligned with the second aperture, the second sensor monitoring whether the contact surface of the housing is in contact with an item, the second sensor communicating whether the contact surface of the housing is in contact with an item, the processor interpreting the communication from the second sensor to determine if an alarm condition exists.

28. The EAS device of claim 24, wherein:

the band is an elastic band.

29. The EAS device of claim 21, further comprising:

an arming switch in the housing; and, an arming aperture in the housing, the arming switch being located in the housing to be accessible at the arming aperture.

* * * * *